United States Patent
Nishimura et al.

(10) Patent No.: US 8,915,540 B2
(45) Date of Patent: Dec. 23, 2014

(54) VEHICLE UPPER STRUCTURE

(75) Inventors: Yoshikazu Nishimura, Hiroshima (JP);
Tsuyoshi Kondo, Hiroshima (JP);
Yasunari Futamura, Hiroshima (JP);
Kazumi Shimizu, Hiroshima (JP);
Kosuke Kojima, Hiroshima (JP); Seiji Nakano, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/983,512

(22) PCT Filed: Feb. 17, 2012

(86) PCT No.: PCT/JP2012/001071
§ 371 (c)(1),
(2), (4) Date: Aug. 2, 2013

(87) PCT Pub. No.: WO2012/114699
PCT Pub. Date: Aug. 30, 2012

(65) Prior Publication Data
US 2013/0320716 A1 Dec. 5, 2013

(30) Foreign Application Priority Data
Feb. 25, 2011 (JP) .................................. 2011-039237

(51) Int. Cl.
*B60R 13/07* (2006.01)
*B62D 25/04* (2006.01)
*B62D 25/06* (2006.01)

(52) U.S. Cl.
CPC ................ *B62D 25/06* (2013.01); *B62D 25/04* (2013.01)

USPC ......................................................... 296/210

(58) Field of Classification Search
USPC ................. 296/210, 187.12, 193.05, 193.06, 296/203.01, 203.03, 204, 30
See application file for complete search history.

(56) References Cited

U.S. PATENT DOCUMENTS 4,252,364 A * 2/1981 Toyama et al. .......... 296/203.01
4,938,525 A * 7/1990 Yamauchi ................ 296/203.03
(Continued)

FOREIGN PATENT DOCUMENTS

JP 08-067271 A 3/1996
JP 10-167114 A 6/1998
(Continued)

OTHER PUBLICATIONS

International Search Report; PCT/JP2012/001071; May 1, 2012.

*Primary Examiner* — Kiran B Patel
(74) *Attorney, Agent, or Firm* — Studebaker & Brackett PC

(57) ABSTRACT

Provided is a vehicle upper structure which is capable of increasing, in a simple manner, a section modulus (resistive force) against a bending moment to be imposed on a roof reinforcement by a swinging phenomenon of a gusset occurring when a side impact load input into a center pillar and a roof side rail member is applied to the roof reinforcement from the gusset during a vehicle side impact event, to allow the load to be effectively dispersed to the roof reinforcement. The vehicle upper structure comprises a roof side rail member 4, a roof reinforcement 15 and a gusset 30, wherein an end of the gusset 30 on a side fastened to the roof reinforcement 15 has a shape which inclines with respect to a line L1 oriented in a vehicle front-rear direction, in top plan view.

8 Claims, 12 Drawing Sheets

(56) References Cited

U.S. PATENT DOCUMENTS

| | | | |
|---|---|---|---|
| 5,873,618 A * | 2/1999 | Ejima | 296/30 |
| 6,073,992 A * | 6/2000 | Yamauchi et al. | 296/203.01 |
| 6,481,788 B1 * | 11/2002 | Moriyama et al. | 296/216.07 |
| 6,619,729 B2 * | 9/2003 | Kimura et al. | 296/203.03 |
| 7,121,615 B2 * | 10/2006 | Hoshino | 296/203.03 |
| 7,407,222 B2 * | 8/2008 | Anderson et al. | 296/193.06 |
| 7,810,871 B2 * | 10/2010 | Matsui | 296/187.12 |
| 7,963,591 B2 * | 6/2011 | Duguet et al. | 296/203.03 |
| 8,123,286 B2 * | 2/2012 | Furusako et al. | 296/203.03 |
| 8,613,467 B2 * | 12/2013 | Tanaka et al. | 280/730.2 |
| 8,678,484 B2 * | 3/2014 | Shono | 296/203.03 |
| 2002/0195840 A1 * | 12/2002 | Mishima et al. | 296/203.01 |
| 2014/0028057 A1 * | 1/2014 | Nishimura et al. | 296/193.06 |
| 2014/0054927 A1 * | 2/2014 | Nakamura et al. | 296/193.06 |

FOREIGN PATENT DOCUMENTS

| | | |
|---|---|---|
| JP | 2001-294174 A | 10/2001 |
| JP | 2008-247189 A | 10/2008 |
| JP | 2009-214561 A | 9/2009 |
| JP | 2011-057146 A | 3/2011 |
| JP | 2012-025311 A | 2/2012 |

* cited by examiner

Fig. 12
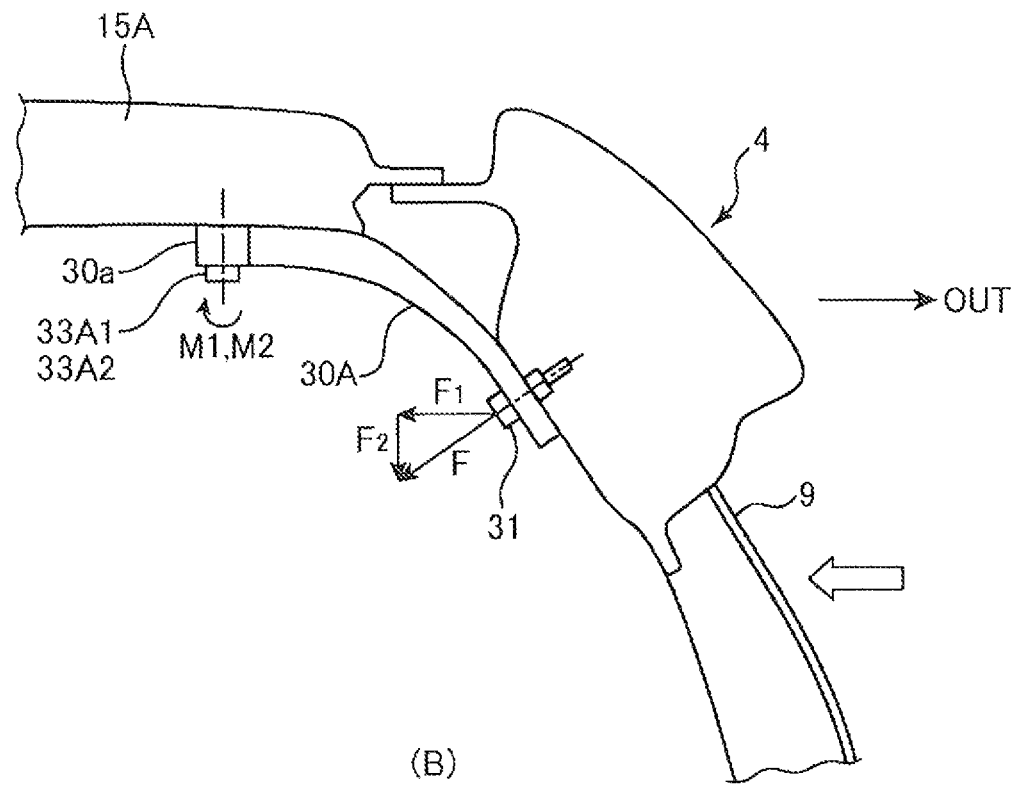
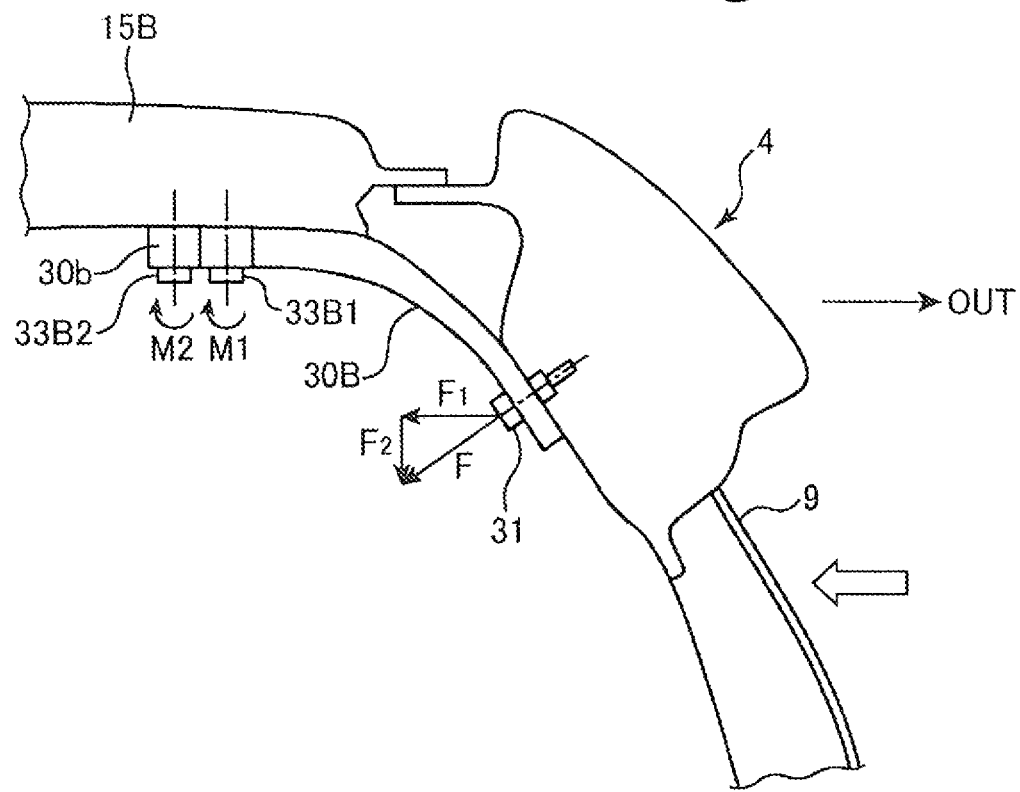

VEHICLE UPPER STRUCTURE

TECHNICAL FIELD

The present invention relates to a vehicle upper structure, and more specifically to a vehicle upper structure which comprises: right and left roof side rail members each extending in a vehicle front-rear direction above a respective one of right and left center pillars; a roof reinforcement connecting the right and left roof side rail members in a vehicle width direction; and right and left gussets each coupling the roof reinforcement and a respective one of the right and left roof side rail members together, wherein each of the right and left gussets is bolt-fastened to a lower surface of the roof reinforcement and a roof side rail inner panel of a respective one of the right and left roof side rail members.

BACKGROUND ART

In a conventional vehicle upper structure, as illustrated in FIG. 10, a center pillar 80 extending in an up-down direction has an upper end coupled to a roof side rail member 84 comprising a roof side rail outer panel 81 and a roof side rail inner panel 82 and having a roof side closed cross-section 83 extending in a vehicle front-rear direction, and a lower end coupled to a side sill 89 comprising a side sill outer panel 85, a side sill reinforcement 86 and a side sill inner panel 87 and having a side sill closed cross-section 88 extending in the vehicle front-rear direction.

In the conventional structure illustrated in FIG. 10, during a vehicle side impact event, a side impact load is input to the center pillar 80 from the direction indicated by the arrow in FIG. 10, and the center pillar 80 directly receiving the side impact load is inwardly bent or deformed as indicated by the two-dot chain line alpha in FIG. 10, to absorb the side impact load by means of the deformation.

In other words, the conventional structure is configured to absorb a side impact load by permitting an inward bending of the center pillar 80 to some extent. However, this is problematic because it cannot be denied that there is a certain amount of intrusion of the center pillar 80 in a vehicle-width inward direction.

In the conventional structure illustrated in FIG. 10, no large load is input to a roof reinforcement serving as a reinforcing member mutually connecting right and left roof side rail members in a vehicle width direction, because the structure is configured to absorb a side impact load by means of an inward bending of the center pillar 80.

A vehicle upper structure intended to suppress an inward bending of a center pillar so as to solve the above problem has already been invented (see FIG. 11).

FIG. 11 illustrates a conventional vehicle upper structure as viewed upwardly from a bottom of a vehicle (bottom view), wherein: the reference numeral 90 indicates a left (& right) roof side rail member having a closed cross-section structure and extending in a vehicle front-rear direction; 91 indicates a roof reinforcement serving as a reinforcement member connecting the right and left roof side rail members 90, 90 in a vehicle width direction; 92 indicates a left (& right) center pillar having a closed cross-section structure and extending in an up-down direction; and 93 indicates a left (& right) gusset coupling the roof reinforcement 91 and the left (& right) roof side rail member 90 together. The left (& right) gusset 93 is fastened to an inner panel of the left (& right) roof side rail member 90, i.e., a left (& right) roof side rail inner pane, by using a pair of front and rear fastening bolts 94, 94, and fastened to a lower surface of the roof reinforcement 91 by using a pair of front and rear fastening bolts 95, 95.

In relation to suppressing the inward bending of the center pillar 92, the conventional structure illustrated in FIG. 11 is configured to increase rigidity of the center pillar 92.

In this structure, a side impact load input into the center pillar 92 during a vehicle side impact event is applied to the roof reinforcement 91 via the gusset 93 located just above the center pillar 92 and fastening points of the bolts 95. However, if the load applied to the roof reinforcement 91 becomes fairly larger than that in the structure illustrated in FIG. 10, to cause an increase in bending moment imposed on the roof reinforcement 91, a problem will occur that the roof reinforcement 91 is bent in the middle thereof, and consequently the entire center pillar 92 falls inwardly.

As measures for preventing such middle bending of the roof reinforcement, it is conceivable to increase a wall thickness (i.e., plate thickness) of the roof reinforcement 91, and/or increase a width W of the roof reinforcement 91 in the vehicle front-rear direction, to increase rigidity of the roof reinforcement 91. However, this approach is disadvantage in terms of weight reduction.

When a side impact load is input from the center pillar 92, the load is also applied to an end 93a of the gusset 93 on a side fastened to the roof reinforcement. However, a width of the end 93a in the vehicle front-rear direction is kept equal to a width of the gusset 93 itself in the vehicle front-rear direction without modification, which is problematic in that the structure is not configured to sufficiently resist against a bending moment to be imposed on the roof reinforcement 91.

Meanwhile, the following Patent Literature (PTL 1) discloses a vehicle upper structure in which a lower surface of a roof reinforcement extending in a vehicle width direction is bolt-fastened to a roof side rail inner panel of a roof side rail member through an L-shaped gusset.

In the conventional structure disclosed in the PTL 1, an end of the gusset on a side fastened to the roof reinforcement is parallel to or approximately parallel to a line oriented in a vehicle front-rear direction. Thus, this structure is substantially equivalent to the conventional structure illustrated in FIG. 11, i.e., problematic in that it is not configured to sufficiently resist against a bending moment to be applied to the roof reinforcement.

CITATION LIST

Patent Literature

PTL 1: JP 2008-247189 A

SUMMARY OF INVENTION

Technical Problem

It is therefore an object of the present invention to provide a vehicle upper structure capable of increasing, in a simple manner, a resistive force against a bending moment to be imposed on a roof reinforcement by a swinging phenomenon of a gusset occurring when a side impact load input into a center pillar and a roof side rail member is applied to the roof reinforcement from the gusset during a vehicle side impact event, to allow the load to be effectively dispersed to the roof reinforcement.

Solution to Problem

The present invention provides a vehicle upper structure which comprises: right and left roof side rail members (4)

provided above a center pillar (9); a roof reinforcement (15) extending in a vehicle width direction; a gusset (30) coupling the roof side rail member (4) and the roof reinforcement (15) together; and a fastening member (33, 31) for coupling the gusset (30) to each of a roof side rail inner panel (7) of the roof side rail member (4) and a lower surface of the roof reinforcement (15), wherein an end of the gusset (30) on a side fastened to the roof reinforcement (15) has a shape which inclines with respect to a line oriented in a vehicle front-rear direction, in top plan view.

In the vehicle upper structure of the present invention, the end of the gusset on the side fastened to the roof reinforcement is configured to incline with respect to the line oriented in the vehicle front-rear direction, so that it becomes possible to increase, in a simple manner, a resistive force against a bending moment to be imposed on the roof reinforcement as a reinforcing member by a swinging phenomenon of the gusset occurring when a side impact load input into the center pillar and the roof side rail member is applied to the roof reinforcement from the gusset during a vehicle side impact event, to allow the load to be effectively dispersed to the roof reinforcement.

More specifically, the inclined end of the gusset leads to an increase in section modulus (resistive force), which leads to enhancement in section stiffness or proof strength against concentrated load, so that it becomes possible to withstand a side impact. This makes it possible to allow the side impact load to be effectively dispersed to the roof reinforcement, while suppressing middle bending of the roof reinforcement.

BRIEF DESCRIPTION OF DRAWINGS

FIGS. 12A and 12B are schematic explanatory diagrams each illustrating a state in which an impact load (outlined arrow) during a side impact event is input into a center pillar, and transmitted to a roof reinforcement via a gusset.

DESCRIPTION OF EMBODIMENTS

One embodiment of the present invention will now be specifically described based on the drawings.

Figure 1:
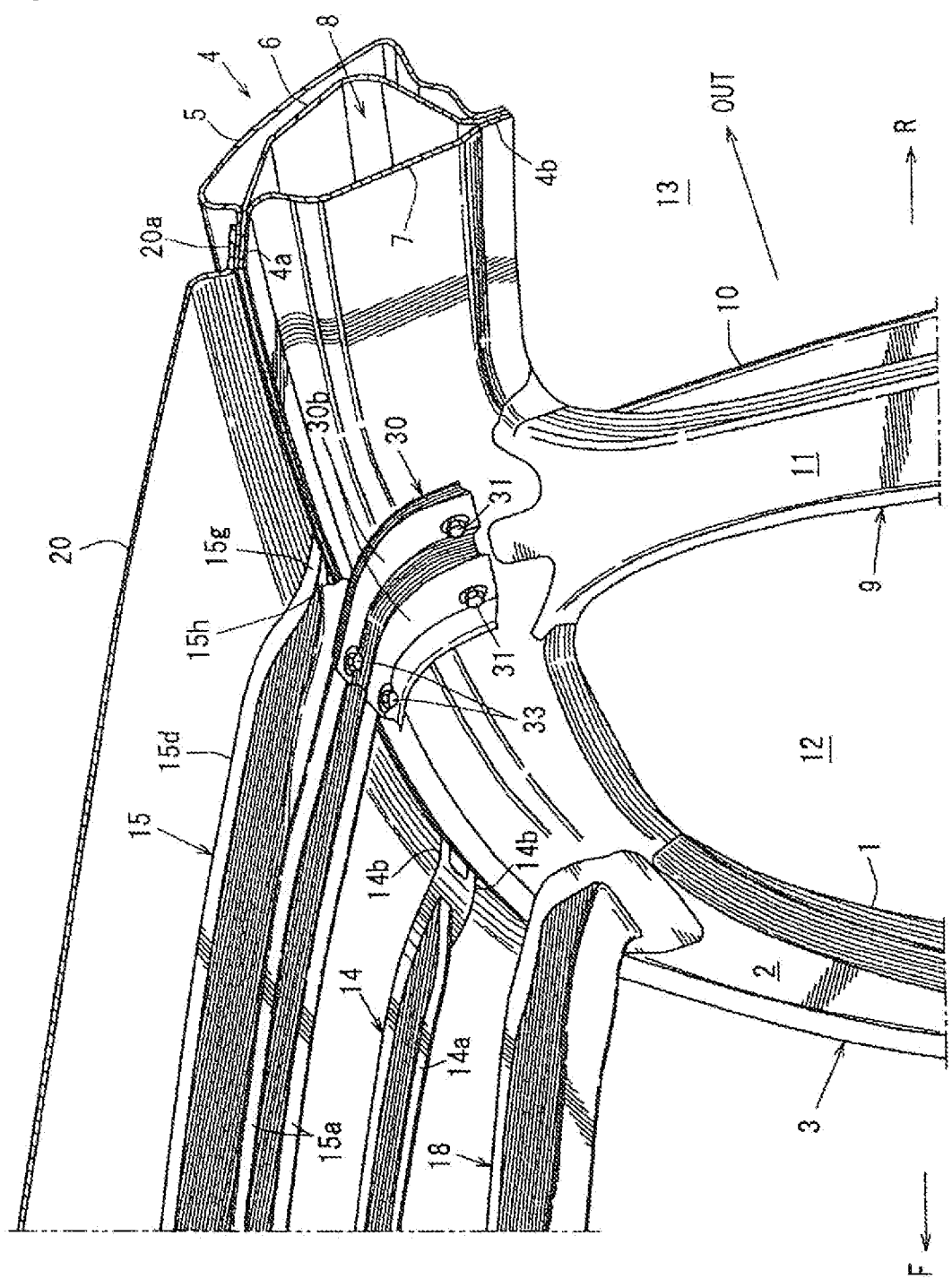
FIG. 1 is a perspective view illustrating a vehicle upper structure according to the present invention.
Figure 2:
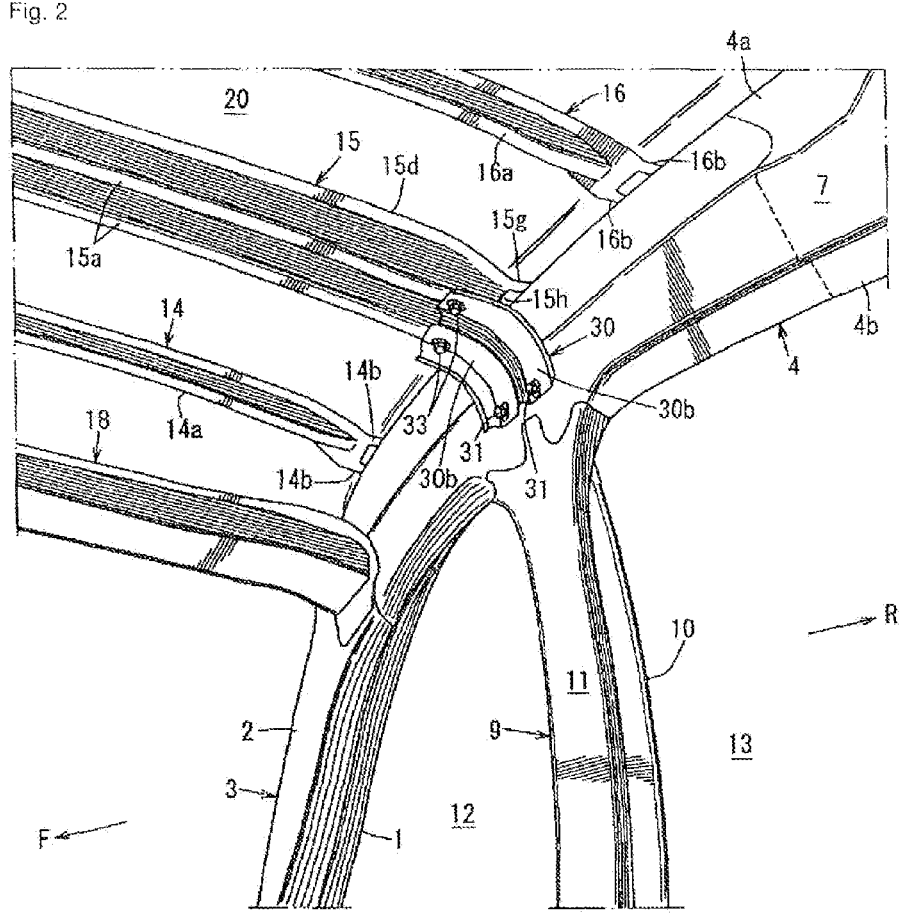
FIG. 2 is a perspective view illustrating the vehicle upper structure as viewed from an angle different from that in FIG. 1.
Figure 3:
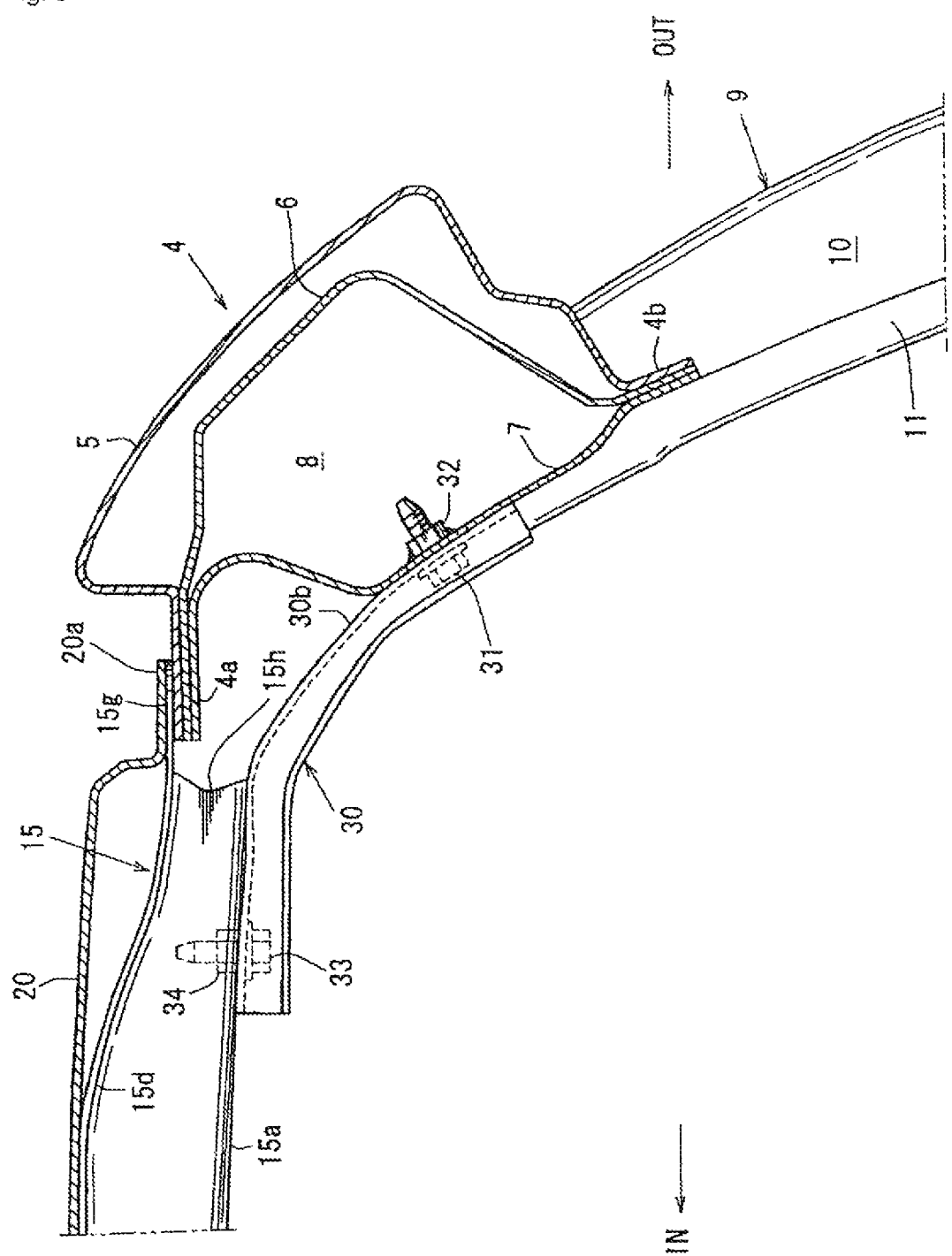
FIG. 3 is a cross-sectional view illustrating the vehicle upper structure.

The drawings illustrates a vehicle upper structure, wherein FIG. 1, FIG. 2 and FIG. 3 are, respectively, a perspective view as viewed upwardly toward a roof from a bottom of a vehicle, a perspective view as viewed from an angle different from that in FIG. 1, and a rear view of the vehicle upper structure, which cross-sectionally represents a roof side rail member.

In FIGS. 1 and 2, a front pillar outer panel 1 and a front pillar inner panel 2 are joined and fixed together to provide a front pillar 3 having a closed cross-section extending obliquely upwardly toward a rear of the vehicle.

A roof side rail 4 as a roof side rail member is provided at a rear end of the front pillar 3 to extend continuously from the front pillar 3 toward the rear of the vehicle.

The roof side rail 4 is a rigid vehicle body member extending along a vehicle front-rear direction in an upper and side region (i.e., roof side region) of a vehicle body. The roof side rail 4 comprises a roof side rail outer panel 5, a roof side rail reinforcement 6 and a roof side rail inner panel 7, wherein a roof side closed cross-section 8 is defined between the roof side rail outer panel 5 and the roof side rail inner panel 7 to extend in the vehicle front-rear direction.

As illustrated in FIG. 3 in the form of a cross-sectional view, the above roof side rail 4 has two composite flanges 4a, 4b provided, respectively, on upper and lower sides thereof. The upper composite flange 4a is formed by joining respective upper ends of the roof side rail outer panel 5, the roof side rail reinforcement 6 and the roof side rail inner panel 7 to extend approximately horizontally and inwardly in a vehicle width direction.

The lower composite flange 4b is formed by joining respective lower ends of the roof side rail outer panel 5, the roof side rail reinforcement 6 and the roof side rail inner panel 7 to extend obliquely downwardly and outwardly.

A center pillar 9 is provided which connects, in an up-down direction, a longitudinally intermediate portion of the roof side rail 4 in the upper region of the vehicle body, and a non-illustrated corresponding side sill in a lower region of the vehicle body.

The center pillar 9 is a rigid vehicle body member (vehicle body strengthening member) formed by joining and fixing a center pillar outer panel 10 and a center pillar inner panel 11 together to have a center pillar closed cross-section extending in a vehicle up-down direction. The center pillar 9 has enhanced rigidity with a view to preventing inward bending deformation thereof.

The right (and left) roof side rail 4 (in the figures, only a structure on a right side of the vehicle is illustrated) is coupled and fixed to an upper end of the right (and left) center pillar 9. As illustrated in FIGS. 1 and 2, a front door opening 12 for a front seat occupant is formed in front of the center pillar 9 extending in the up-down direction, and a rear door opening 13 for a rear seat occupant is formed behind the center pillar 9.

Figure 4:
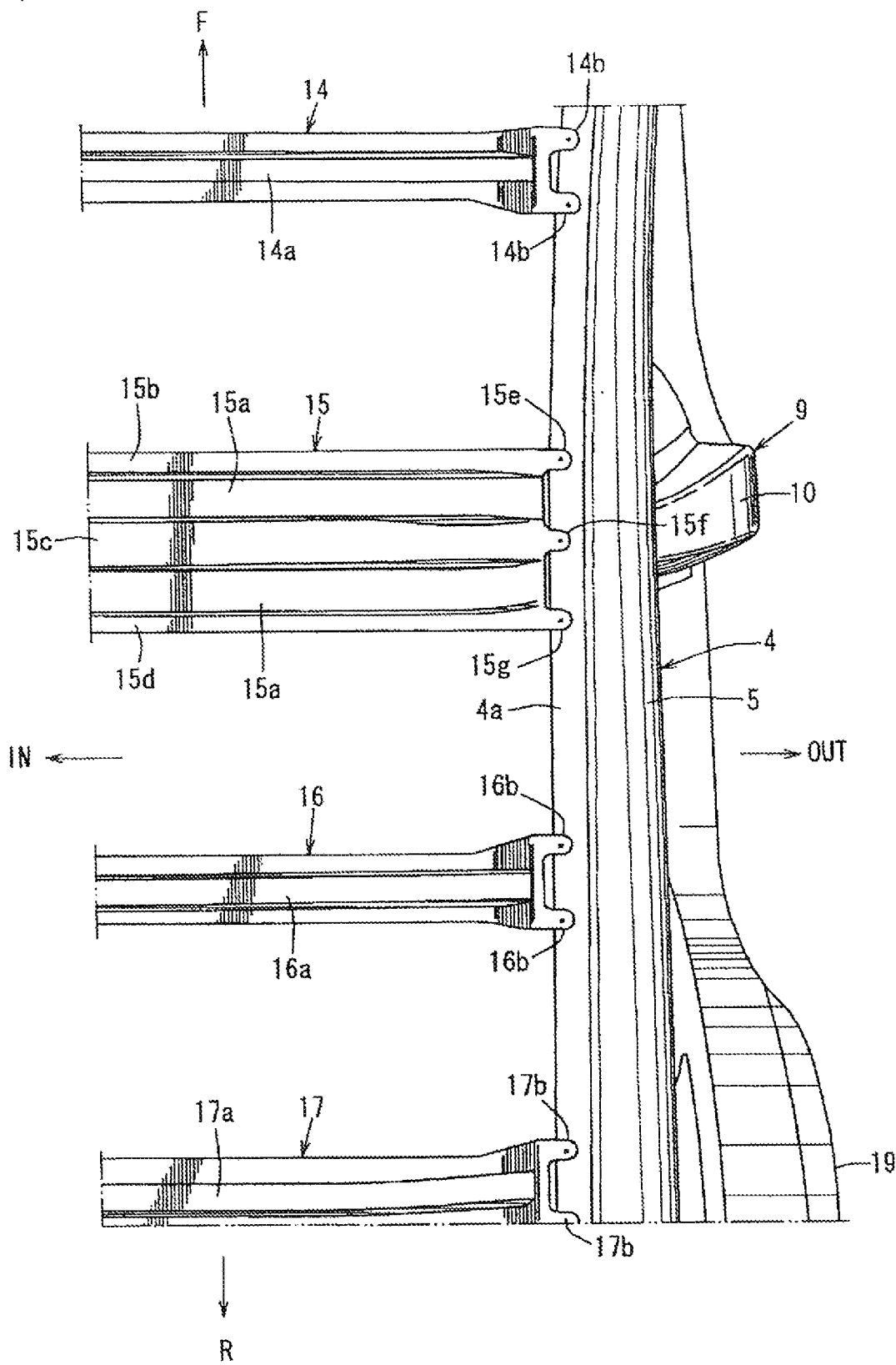
FIG. 4 is a top plan view illustrating the vehicle upper structure, wherein a roof panel is detached.

As illustrated in FIG. 4 which is a top plan view of the vehicle upper structure in a state after detaching a roof panel, the right and left roof side rails 4, 4 are connected together by a plurality of roof reinforcements 14, 15, 16, 17 each serving as a reinforcing member extending in the vehicle width direction.

The plurality of roof reinforcements 14, 15, 16, 17 are disposed parallel to each other in spaced-apart relation in the vehicle front-rear direction. In this embodiment, each of the roof reinforcements 14, 16, 17 is configured such that a length thereof in the vehicle front-rear direction has a relatively small value, and the roof reinforcement 15 corresponding to the center pillar 9 is configured such that a length thereof in the vehicle front-rear direction has a relatively large value.

Among the roof reinforcements 14 to 17, the roof reinforcement 15 is provided in a region corresponding to the center pillar 9, and the roof reinforcement 14 is provided between the region corresponding to the center pillar 9 and a front header 18 illustrated in FIGS. 1 and 2. Further, the roof reinforcement 16 is provided rearward of the roof reinforcement 15 with a predetermined distance therebetween, and the roof reinforcement 17 is provided rearward of the roof reinforcement 16 and in a region corresponding to a rear fender panel 19.

Among the roof reinforcements 14 to 17, the roof reinforcement 14 (16, 17) is provided with a bead 14a (16a, 17a) which extends over the entire width thereof in the vehicle width direction while protruding downwardly from the side of the roof toward a vehicle interior, and a pair of front and rear joint pieces 14b, 14b (16b, 16b; 17b, 17b) integrally formed with each end thereof in the vehicle width direction.

Each of the joint pieces 14b, 16b, 17b is joined and fixed to the upper composite flange 4a of the roof side rail 4 from thereabove. In FIG. 4, a joined point (welded point) of each of the joint pieces 14b, 16b, 17b by spot welding is indicated by the black circle, for the sake of illustrative convenience.

Among the roof reinforcements 14 to 17, the roof reinforcement 15 corresponding to the center pillar 9 is configured as illustrated in FIGS. 4 to 8.

Figure 8:
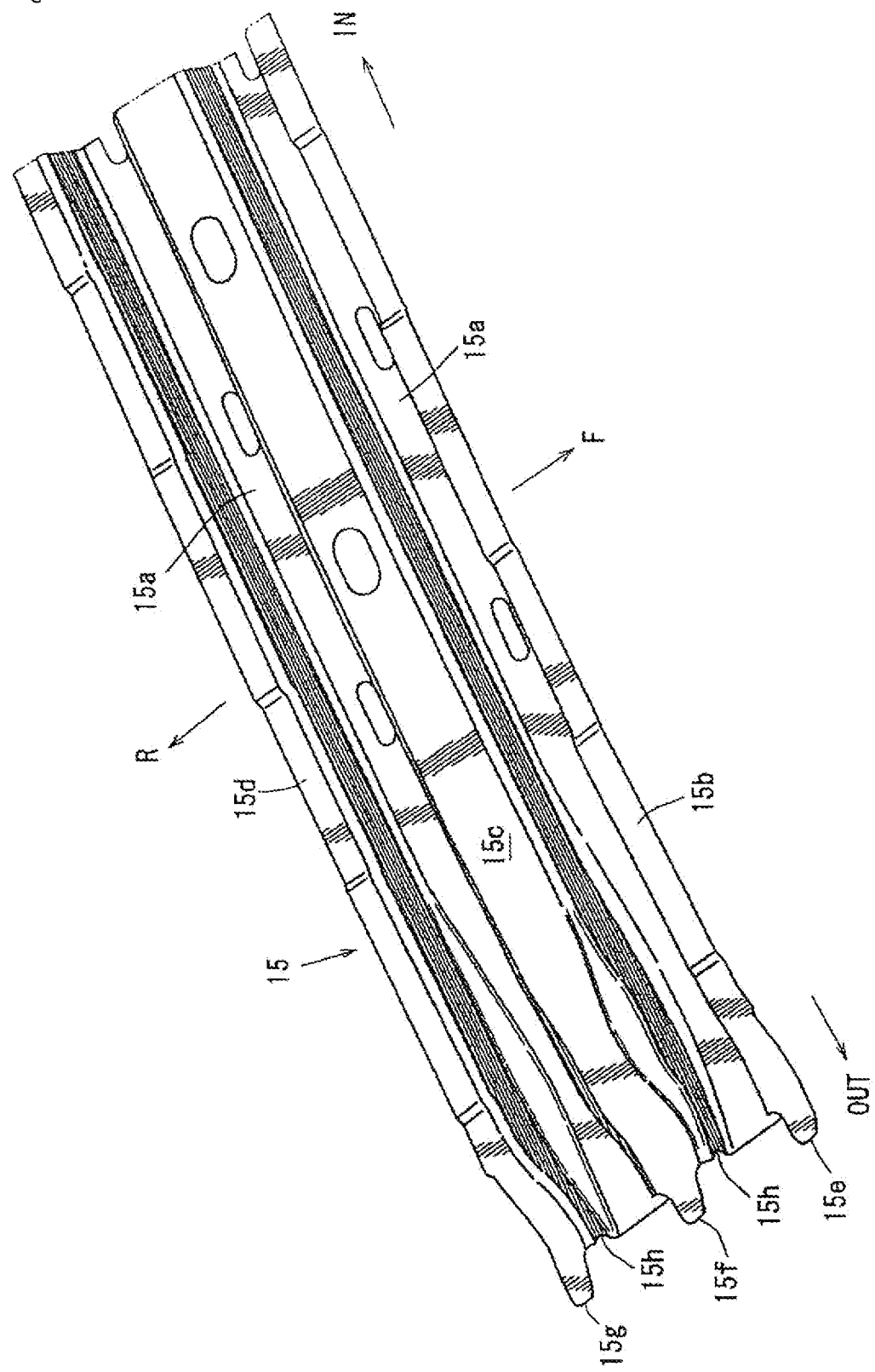
FIG. 8 is a perspective view illustrating the roof reinforcement, independently

Specifically, the roof reinforcement 15 has a plurality of concave and convex beads 15a, 15a in vertical cross-sectional side view. As illustrated in FIG. 8, each of the plurality of concave and convex beads 15a extends over the entire width of the roof reinforcement 15 in the vehicle width direction. This configuration provides lightweight and high rigidity to the roof reinforcement 15.

In this embodiment, the above roof reinforcement 15 has a plurality of roof-panel contact surfaces 15b, 15c, 15d contactable with a lower surface of a roof panel 20 illustrated in FIGS. 1, 2 and 3. As illustrated in FIG. 8, each of the plurality of roof-panel contact surfaces 15b, 15c, 15d also extends over the entire width of the roof reinforcement 15 in the vehicle width direction. Each of the roof-panel contact surfaces 15b, 15c, 15d and the roof panel are joined together by a non-illustrated adhesive.

An end of each of the roof-panel contact surfaces 15b, 15c, 15d in the vehicle width direction is integrally formed with a respective one of a plurality of joint pieces 15e, 15f, 15g. Each of the joint pieces 15e, 15f, 15g is joined and fixed to the upper composite flange 4a of the roof side rail 4 from thereabove. In FIG. 4, a joined point (welded point) of each of the joint pieces 15e, 15f, 15g by spot welding is indicated by the black circle, for the sake of illustrative convenience.

As illustrated in FIG. 3, an edge of the roof reinforcement 15 in the vehicle width direction is disposed opposed to the upper composite flange 4a of the roof side rail 4, and formed with a V-shaped depression 15h as a V-shaped notch-like portion for guidingly receiving therein the composite flange 4a during a side impact event.

Figure 7:
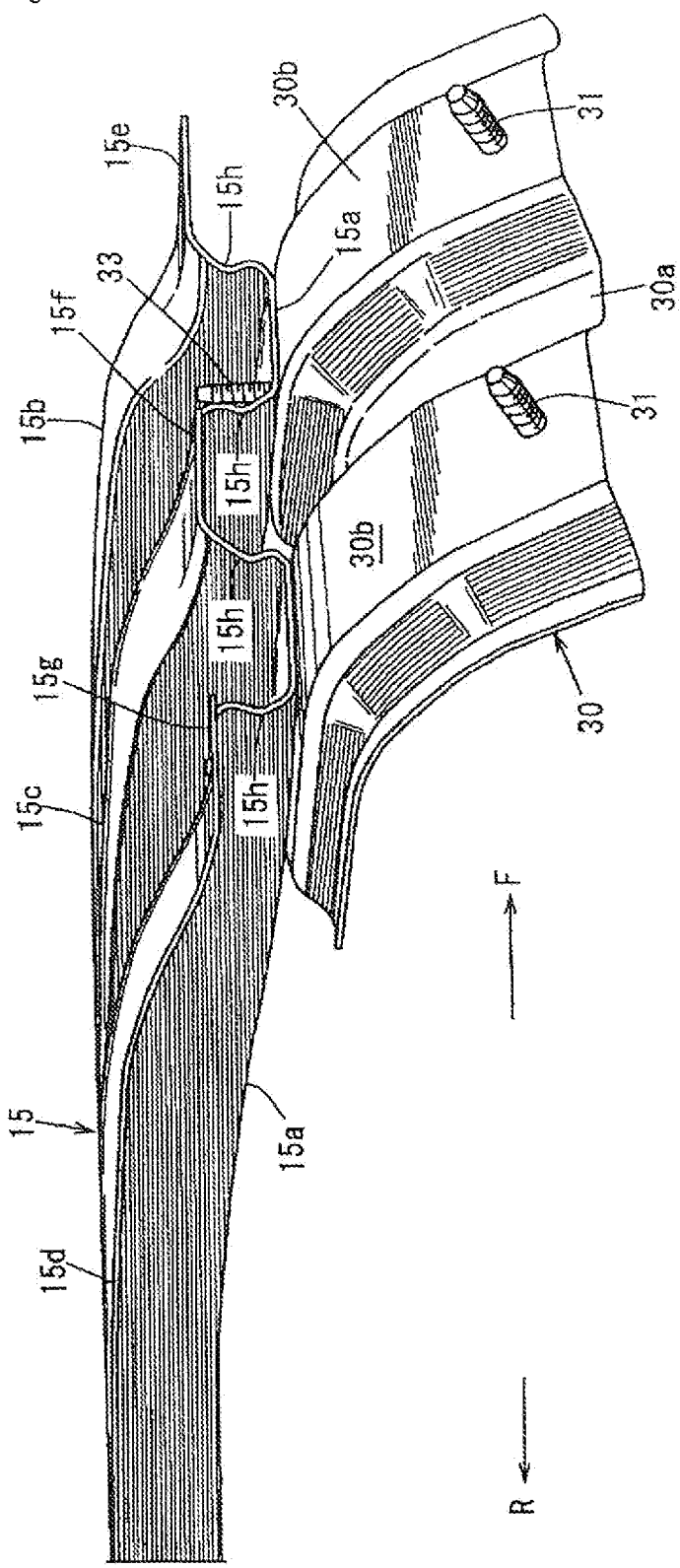
FIG. 7 is a perspective view illustrating the coupled structure as viewed from an angle different from that in FIG. 6.

As illustrated in FIG. 3, the V-shaped depression 15h is formed in a laterally-facing V shape having an opening facing outside the vehicle, and formed in a plural number (in this embodiment, in a number of four) corresponding to the number of the concave and convex beads 15a,—(see FIG. 7).

Based on forming the V-shaped depressions 15h, when the roof side rail 4 is displaced inwardly during a side impact event, the upper composite flange 4a of the roof side rail 4 is reliably received by the V-shaped depressions 15h to reliably transmit and disperse a side impact load to the roof reinforcement 15.

After joining and fixing the joint pieces 14b, 14b of the roof reinforcement 14, the joint pieces 15e, 15f, 15g of the roof reinforcement 15, the joint pieces 16b, 16b of the roof reinforcement 16 and the joint pieces 17b, 17b of the roof reinforcement 17, to the upper composite flange 4a of the roof side rail 4 as illustrated in FIG. 4 in the form of a top plan view, a step-like concave portion 20a of the roof panel 20 (so-called "mohican groove-forming piece") is additionally fixed onto the composite flange 4a (see FIGS. 1 and 3).

The front header 18 illustrated in FIGS. 1 and 2 is a rigid vehicle body member mutually connecting respective upper ends of a right and left pair of the front pillars 3, 3 in the vehicle width direction.

As illustrated in FIGS. 1, 2, 3, 5, 6 and 7, a gusset 30 is provided in a region corresponding to the center pillar 9 to couple the roof side rail 4 and the roof reinforcement 15 together.

Specifically, as illustrated in FIG. 3, the gusset 30 is fastened to the roof side rail inner panel of the roof side rail 4 by using a bolt 31 and a nut 32, and further fastened to a lower surface of the roof reinforcement 15 by using a bolt 33 and a nut 34. In other words, the gusset 30 is bolt-fastened to each of the roof side rail 4 and the roof reinforcement 15.

In this embodiment, the nut 32 is preliminarily welded and fixed to one surface of the roof side rail inner panel 7 on the side of the closed cross-section 8, as illustrated in FIG. 3. Similarly, the nut 34 is preliminarily welded and fixed to one surface of the roof reinforcement 15 on the side of the roof panel 20, as illustrated in FIG. 3.

Figure 9:
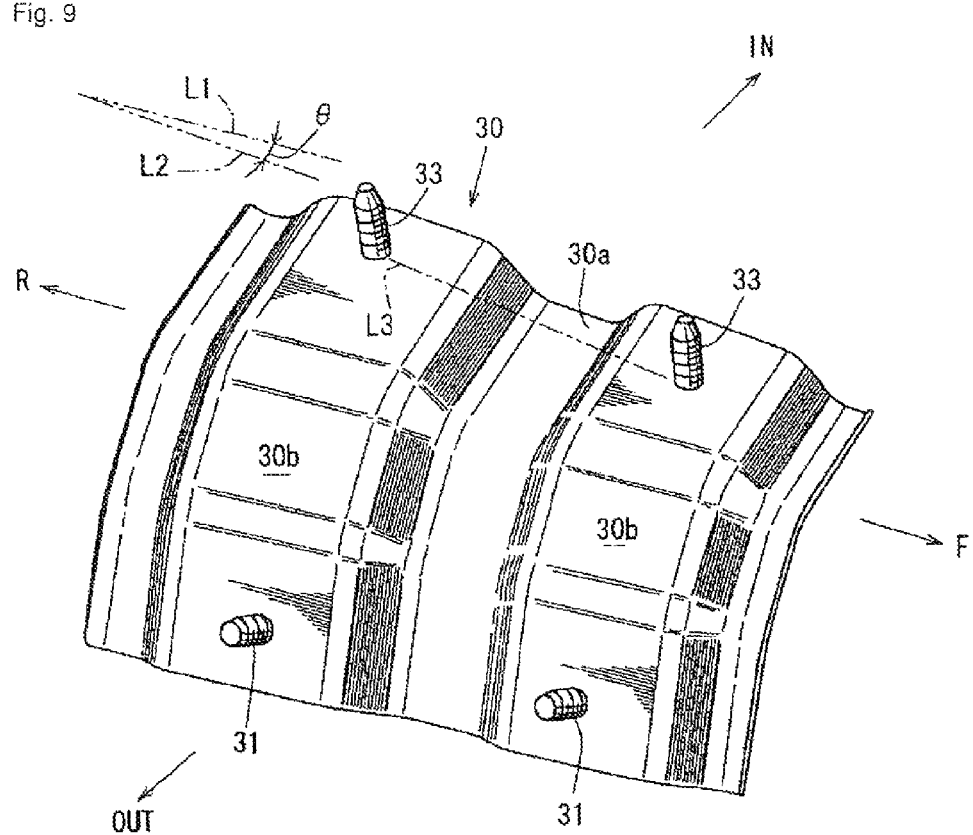
FIG. 9 is a perspective view illustrating the gusset, independently.
Figure 10:
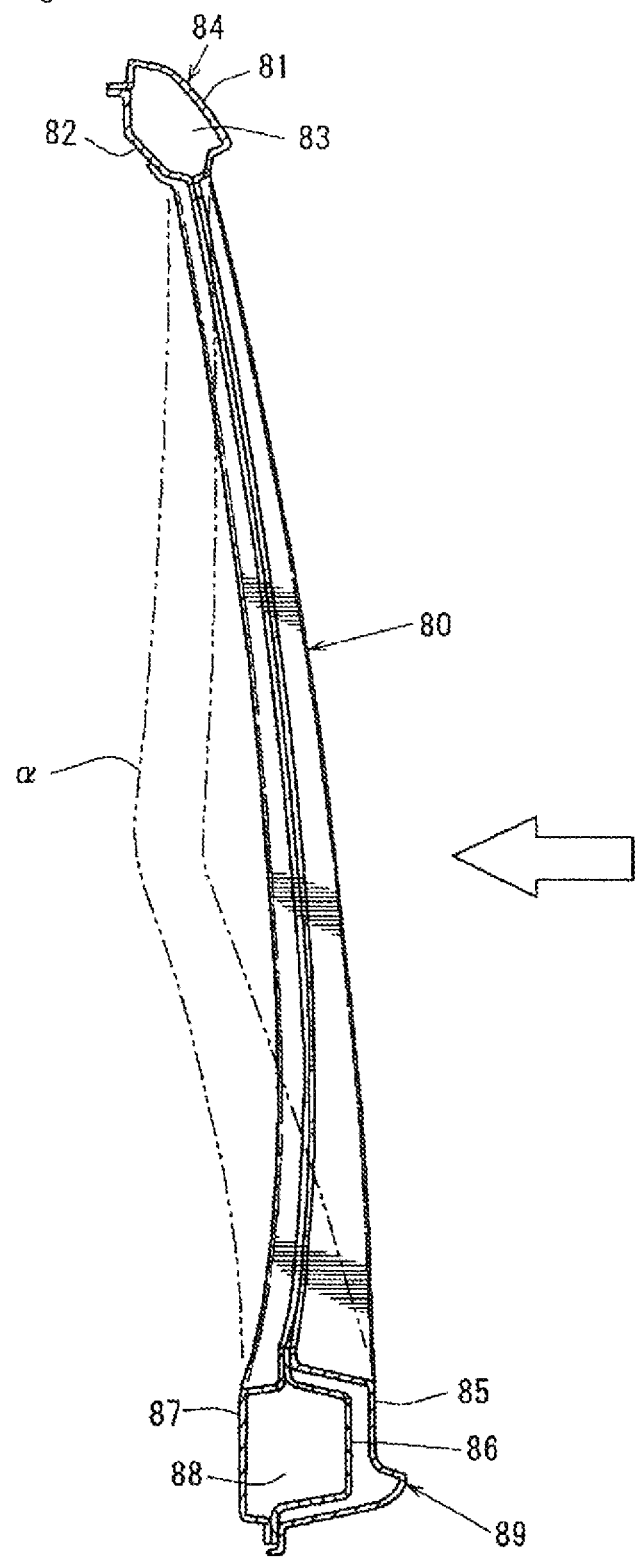
FIG. 10 is a front view illustrating a conventional center pillar support structure.
Figure 11:
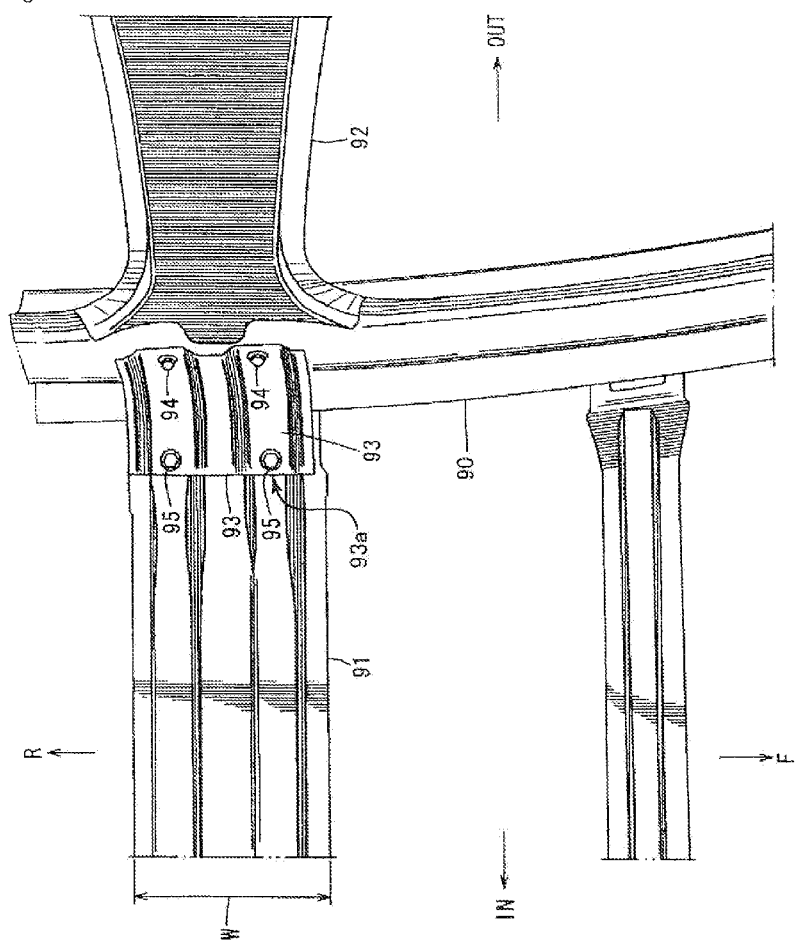
FIG. 11 is a bottom view illustrating a conventional vehicle upper structure.

As illustrated in FIG. 9 by itself, the gusset 30 integrally has a base portion 30a, and a plurality of (e.g., two) lines of beads 30b, 30b formed on front and rear sides of the base portion 30a to protrude toward the roof side rail inner panel 7 and the roof reinforcement 15. The gusset 30 is configured to improve its own rigidity based on this multi-bead structure.

The gusset 30 is fastened at respective positioned spaced apart from each other in the vehicle front-rear direction by using a plurality of bolts 31, 31; 33, 33, while bringing respective upper surfaces of the two lines of beads 30b, 30b into contact with a lower surface of the roof side rail inner panel 7 and the lower surface of the roof reinforcement 15, as illustrated in FIG. 3.

Figure 5:
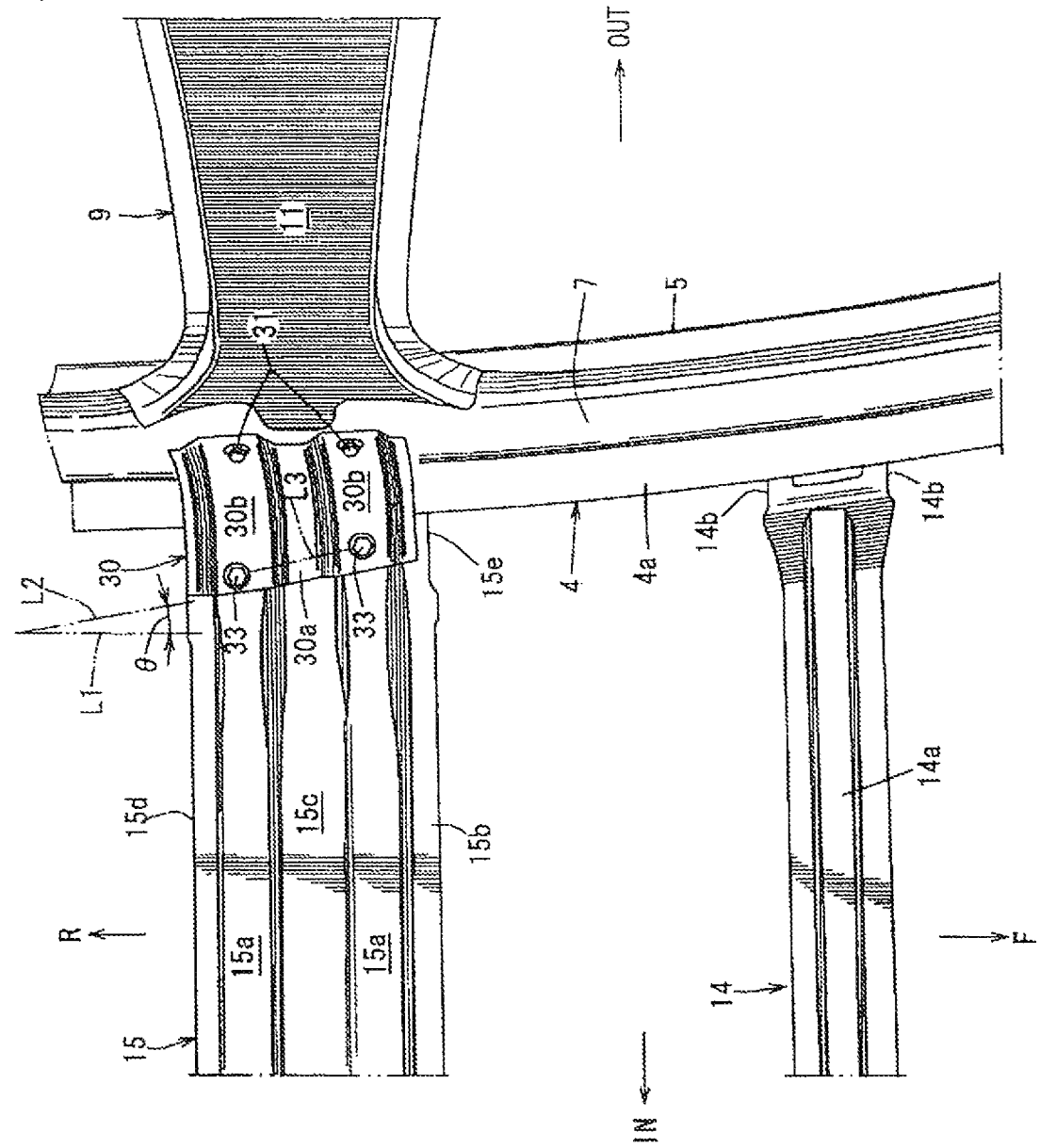
FIG. 5 is a bottom view illustrating the vehicle upper structure.
Figure 6:
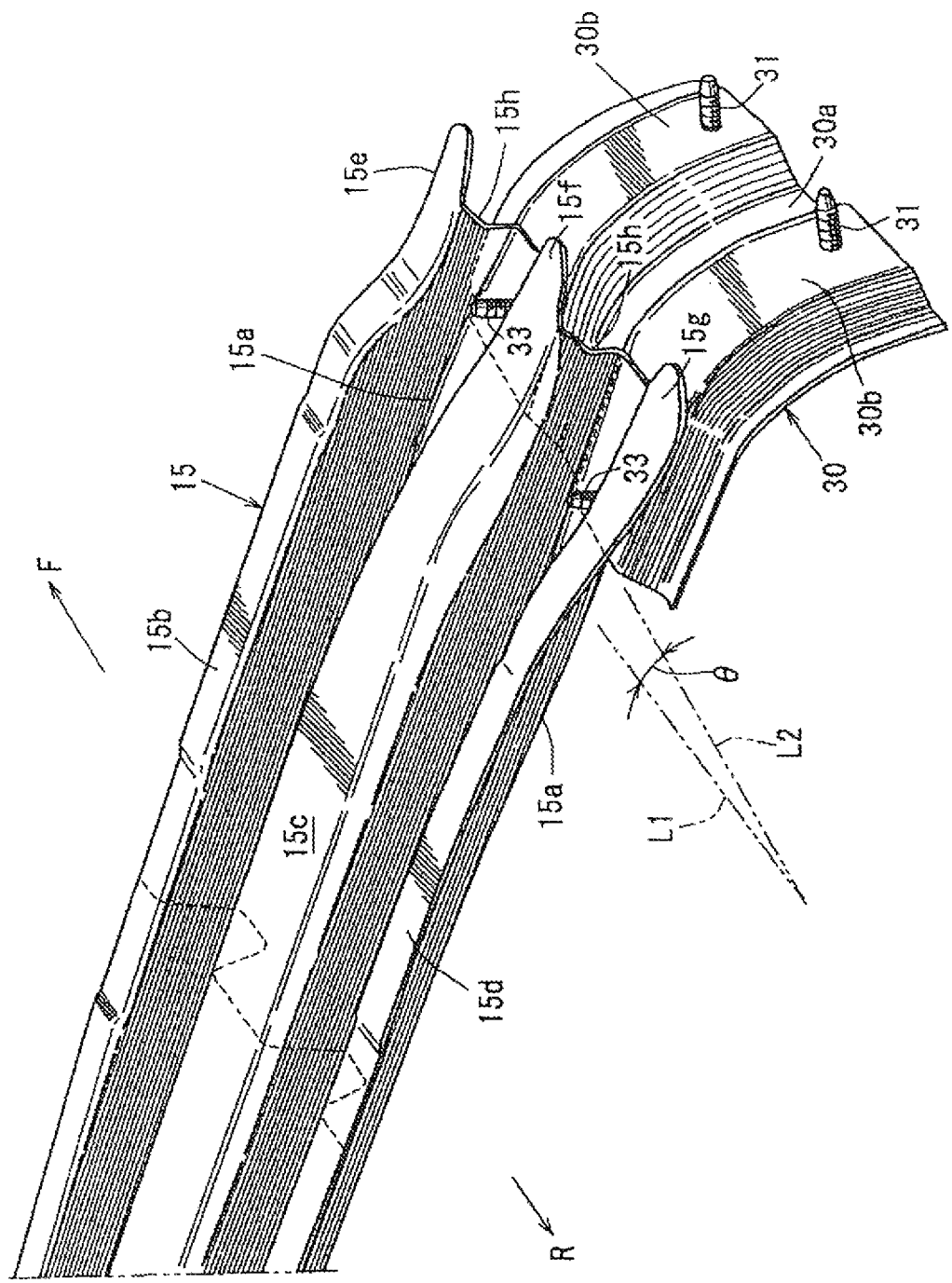
FIG. 6 is a perspective view illustrating a coupled structure of a roof reinforcement and a gusset.

As illustrated in FIG. 5 in the form of a bottom view and in FIG. 6 in the form of a perspective view, with a view to increasing a section modulus (resistive force) of the gusset 30 in a simple manner, an end of the gusset 30 on a side fastened to the roof reinforcement has a shape which inclines with respect to a line L1 oriented in the vehicle front-rear direction, in top plan view. In FIG. 5, the inclination of the end of the gusset 30 on the side fastened to the roof reinforcement is indicated by the two-dot chain line L2 on an extension of the end, wherein an angle theta between the line L1 and the line L2 is set in the range of 8 to 12 degrees (in this embodiment, 10 degrees).

The fastening of the gusset 30 with respect to the roof reinforcement 15 is performed at a plurality of positions in the vehicle front-rear direction, as described above. In this case, a line L3 connecting respective fastening centers of the plurality of bolts 33, 33 (hereinafter referred to as "fastening members") is set to incline with respect to the line L1 oriented in the vehicle front-rear direction, in top plan view, as illustrated FIGS. 5 and 6. In the present invention, the fastening member is not limited to a combination of a bolt 33 and a nut 34. For example, the fastening using the bolt 33 and the nut 34 may be reinforced by welding. Alternatively, the fastening member may be only a welded portion, or may be a rivet.

The gusset 30 is formed such that the inclination (see line L2) of the end of the gusset 30 on the side fastened to the roof reinforcement is oriented in the same direction as the inclination of the line L3 connecting the respective fastening centers of the plurality of bolts 33, 33 for the roof reinforcement 15.

In the figures, the arrowed line F indicates a vehicle front direction, and the arrowed line R indicates a vehicle rear direction. Further, the arrowed line IN indicates a vehicle widthwise inward direction, and the arrowed line OUT indicates a vehicle widthwise outward direction. Although the illustrated embodiment has been described based on a right structure of the vehicle, a left structure of the vehicle is formed symmetrically or approximately symmetrically with the right structure.

The illustrated embodiment is configured as above. An operation thereof will be described below.

As described in connection with FIGS. 5 and 6, the end of the gusset 30 on the side fastened to the roof reinforcement 15 is configured to incline with respect to the line L1 oriented in the vehicle front-rear direction, in top plan view. This inclined end of the gusset 30 leads to an increase in section modulus (resistive force), which leads to enhancement in section stiffness or proof strength against concentrated load.

Therefore, a section modulus (resistive force) against a bending moment to be imposed on the roof reinforcement 15 by a swinging phenomenon of the gusset 30 occurring when a side impact load input into the center pillar 9 and the roof side rail 4 is applied to the roof reinforcement 15 from the gusset 30 during a vehicle side impact event, can be increased in a simple manner to allow the side impact load to be effectively dispersed to the roof reinforcement 15, while suppressing middle bending of the roof reinforcement 15.

As above, the vehicle upper structure according to the above embodiment comprises right and left roof side rails 4 provided above a center pillar 9, a roof reinforcement 15 extending in a vehicle width direction, and a gusset 30 coupling the roof side rail 4 and the roof reinforcement 15 together, wherein the gusset 30 is bolt-fastened to each of a roof side rail inner panel 7 of the roof side rail 4 and a lower surface of the roof reinforcement 15, and wherein an end of the gusset 30 on a side fastened to the roof reinforcement 15 has a shape which inclines with respect to a line L1 oriented in a vehicle front-rear direction, in top plan view (see FIGS. 3 and 5).

In the vehicle upper structure according to the above embodiment, the end of the gusset 30 on the side fastened to the roof reinforcement 15 is configured to incline with respect to the line L1 oriented in the vehicle front-rear direction, in top plan view (see line L2), so that a section modulus (resistive force) against a bending moment to be imposed on the roof reinforcement 15 by a swinging phenomenon of the gusset 30 occurring when a side impact load input into the center pillar 9 and the roof side rail 4 is applied to the roof reinforcement 15 from the gusset 30 during a vehicle side impact event, can be increased in a simple manner to allow the side impact load to be effectively dispersed to the roof reinforcement 15.

In other words, the inclined end (see line L2) of the gusset 30 leads to an increase in section modulus (resistive force), which leads to enhancement in section stiffness or proof strength against concentrated load, so that it becomes possible to withstand a side impact. This makes it possible to allow the side impact load to be effectively dispersed to the roof reinforcement 15, while suppressing middle bending of the roof reinforcement 15.

Referring to FIGS. 12A and 12B, it is able to understand that, when a line segment connecting respective heads (fastening centers) of the two bolts (the number of bolts is not limited to two, but may be three or more) for fastening the end 30a of the gusset 30 to the roof reinforcement 15 in a posture where the end 30a inclines with respect to the vehicle front-rear direction is oriented in approximately the same direction as the inclination of the end 30a of the gusset, a resistive force is increased against a bending moment to be imposed on the roof reinforcement 15 during a side impact event. FIGS. 12A and 12B are explanatory diagrams each illustrating a state in which an impact load (outlined arrow) during a side impact event is input into the center pillar 9, and transmitted to the roof reinforcement 15 via the roof side rail 4 and the gusset 30. As illustrated in FIGS. 12A and 12B, a coupled portion (position of the bolt 31) between the gusset 30 and the roof side rail 4 is bent obliquely downwardly in the vehicle widthwise outward direction with respect to a coupled portion (position of the bolt 33) between the gusset 30 and the roof reinforcement 15. Thus, when an impact force (outlined arrow) is applied to the center pillar 9 horizontally in the vehicle widthwise inward direction during a side impact event, a force F applied to the coupled point (position of the bolt 31) is directed downwardly in the vehicle widthwise inward direction. The force F is divided into a horizontal component F1 and a vertical component F2.

FIG. 12A illustrates a comparative example with respect to the present invention, wherein a gusset 30A is fastened to a roof reinforcement 15A such that an end 30a of the gusset 30A becomes parallel to the vehicle front-rear direction, and a line segment connecting respective fastening centers of two bolts 33A1, 33A2 also becomes parallel to the vehicle front-rear direction, as in a conventional vehicle upper structure. Differently, in FIG. 12B which is a schematic explanatory view illustrating the present invention, an end 30b of the gusset 30B inclines with respect to the vehicle front-rear direction, and a line segment connecting respective fastening centers of two bolts 33B1, 33B2 also inclines with respect to the vehicle front-rear direction (i.e., is approximately parallel to the inclination of the end 30b of the gusset 30B).

Assuming that an impact force (outlined arrow) due to a side impact is applied to the center pillar 9 in each of the configurations of the comparative example (FIG. 12A) and the present invention (FIG. 12B), wherein other conditions, such as a thickness and a material of the gusset 30A (30B) and a shape and a material of the bolt, are matched therebetween. In each of the comparative example and the present invention, according to an impact force (outlined arrow) applied to the center pillar 9 during a side impact event, a downward force component F2 is applied to a fastened portion at a lower end of the gusset 30 (position of the bolt 31). The downward force component F2 is one factor causing a bending moment against the roof reinforcement 15A (15B). The downward force component F2 acts as bending moments M1, M2 at respective points of the bolts 33A (33B) fastening the roof reinforcement 15A (15B) and the gusset 30A (30B).

In the comparative example, the bolts 33A1, 33A2 are fastened at the same position in the vehicle width direction, so that the bending moments M1, M2 are applied to the roof reinforcement 15A at the same position in the vehicle width direction. Thus, the comparative example is configured such that, when the force F due to the side impact is applied, bending of the roof reinforcement 15A about a predetermined line segment (not illustrated) extending in the vehicle front-rear direction is accelerated.

Differently, in the present invention, the bolt 33B1 and the bolt 33B2 are fastened to the roof reinforcement 15B at respective positions spaced apart from each other in the vehicle width direction by a predetermined distance, so that the bending moments M1, M2 are applied to the roof reinforcement 15B at respective fastened points of the bolts 33B1, 33B2 spaced apart from each other in the vehicle width direction by the predetermined distance. Thus, the present invention is not configured such that, when the force F due to the side impact is applied, bending of the roof reinforcement 15B about a predetermined line segment (not illustrated) extending in the vehicle front-rear direction is accelerated. Therefore, it becomes possible to increase a resistive force of the roof reinforcement 15B against the bending moment, as compared to the comparative example.

The roof reinforcement 15 has a plurality of concave and convex beads 15a, 15a in vertical cross-sectional side view, wherein each of the concave and convex beads 15a extends in the vehicle width direction (see FIGS. 6 and 8).

According to this feature, the plurality of concave and convex beads 15a, 15a are provided in the roof reinforcement 15. This allows the roof reinforcement 15 to have high rigidity while facilitating weight reduction.

In the above embodiment, fastening between the gusset 30 and the roof reinforcement 15 is performed at plurality of positions in the vehicle front-rear direction, and a line L3 connecting respective fastening centers of the plurality of bolts 33, 33 inclines with respect to the line L1 oriented in the vehicle front-rear direction, in top plan view (see FIGS. 1, 2, and 5).

According to this feature, the bolts are arranged such that the line L3 connecting respective fastening centers of the bolts inclines. Thus, although a stress is imposed on each bolt fastened point between the gusset 30 and the roof reinforce 15 during input of a side impact load, a section modulus (resistive force) of the gusset 30 can be increased in a simple manner to improve proof strength against the stress.

Specifically, when a side impact load is input from the center pillar 9, a load is applied to the end of the gusset 30 and between the bolt fastened points, and a stress is concentrated on the inclined line L3 connecting the plurality of bolts 33, 33. In this case, the inclination of the end leads to an increase in section modulus (resistive force), which advantageously leads to enhancement in deformation resistance.

In the above embodiment, the inclination of the end of the gusset 30 (see the line L2) has the same direction as the inclination of the line L3 connecting the fastening centers of the plurality of bolts for the roof reinforcement 15 (see FIG. 5).

According to this feature, the inclination of the end of the gusset 30 (see the line L2) has the same direction as the inclination of the line L3 connecting the fastening centers of the bolts. Thus, the inclinations can be formed without using an extra material, so that it becomes possible to allow the load to be dispersed to the roof reinforcement 15 while suppressing an increase in weight of the gusset 30.

In this case, the line L2 as the inclination of the end of the gusset 30, and the line L3 connecting the fastening centers of the bolts, may be parallel to each other or may be approximately parallel to each other.

FIGS. 5 and 6 discloses a layout in which each of the line L2 and the line L3 extends in the vehicle front direction with an inclination defining an angle theta. However, the present invention is not limited to such an inclination layout. For example, contrary to the layout illustrated in FIGS. 5 and 6, each of the line L2 and the line L3 may be set such that it extends in the vehicle rear direction with an inclination defining an angle theta.

In the above embodiment, an edge of the roof reinforcement 15 in the vehicle width direction is disposed opposed to a composite flange of the roof side rail inner panel 7 and a roof side rail outer panel 5 of the roof side rail 4, and formed with a generally V-shaped notch-like portion (see the generally V-shaped depression 15h) for guidingly receiving therein the composite flange during a side impact event (see FIG. 3).

According to this feature, the notch-like portion (generally V-shaped depression 15h) is provided at the edge of the roof reinforcement 15 in the vehicle width direction. Thus, when the roof side rail 4 is displaced inwardly during a side impact event, the composite flange 4a of the roof side rail 4 is reliably received by the notch-like portion (see the generally V-shaped depression 15h) to reliably transmit and disperse a side impact load to the roof reinforcement 15.

In FIG. 3, in a joining region of the step-like concave portion 20a of the roof panel 20, the joint pieces 15e, 15f, 15g of the roof reinforcement 15, the roof side rail outer panel 5, the roof side rail reinforcement 6 and the roof side rail inner panel 7, a cutout or opening is formed in any of the members superimposed in an up-down direction to allow for three-ply spot welding.

As for a correspondence relationship between an element in the appended claims and an element or component in the above embodiment, a roof side rail member and a V-shaped notch-like portion in the appended claims are equivalent, respectively, to the roof side rail 4 and the V-shaped depression 15h in the above embodiment. However, the element in the appended claims is not limited to the element or component in the above embodiment.

For example, in the above embodiment, the inclination of the end of the gusset 30 on the side fastened to the roof reinforcement 15 is configured such that a front side thereof is located relatively offset in the vehicle widthwise outward direction, and a rear side thereof is located relatively offset in the vehicle widthwise inward direction. Alternatively, the inclination may be configured reversely, i.e., configured such that a front side thereof is located relatively offset in the vehicle widthwise inward direction, and a rear side thereof is located relatively offset in the vehicle widthwise outward direction. Further, it is not essential that the inclination of the end of the gusset has the same direction as the inclination of the line connecting the fastening centers of the plurality of bolts for the roof reinforcement.

SUMMARY OF EMBODIMENT

The present invention provides a vehicle upper structure which comprises: right and left roof side rail members 4 provided above a center pillar 9; a roof reinforcement 15 extending in a vehicle width direction; a gusset 30 coupling the roof side rail member 4 and the roof reinforcement 15 together; and a fastening member 33, 31 for coupling the gusset 30 to each of a roof side rail inner panel 7 of the roof side rail member 4 and a lower surface of the roof reinforcement 15, wherein an end of the gusset 30 on a side fastened to the roof reinforcement 15 has a shape which inclines with respect to a line oriented in a vehicle front-rear direction, in top plan view.

In the vehicle upper structure of the present invention, the end of the gusset on the side fastened to the roof reinforcement is configured to incline with respect to the line oriented in the vehicle front-rear direction, so that it becomes possible to increase, in a simple manner, a resistive force against a bending moment to be imposed on the roof reinforcement as a reinforcing member by a swinging phenomenon of the gusset occurring when a side impact load input into the center pillar and the roof side rail member is applied to the roof reinforcement from the gusset during a vehicle side impact event, to allow the load to be effectively dispersed to the roof reinforcement.

More specifically, the inclined end of the gusset leads to an increase in section modulus (resistive force), which leads to enhancement in section stiffness or proof strength against concentrated load, so that it becomes possible to withstand a side impact. This makes it possible to allow the side impact load to be effectively dispersed to the roof reinforcement, while suppressing middle bending of the roof reinforcement.

For reference's sake, the term "section modulus" is synonymous with geometrical moment of inertia, and an increase in section modulus means an increase in deformation resistance.

Preferably, in the vehicle upper structure of the present invention, the roof reinforcement has a plurality of concave and convex beads in vertical cross-sectional side view (when viewed from a left side of FIG. 4), wherein each of the concave and convex beads extends in the vehicle width direction.

According to this feature, the plurality of concave and convex beads are provided in the roof reinforcement. This allows the roof reinforcement to have high rigidity while facilitating weight reduction.

Preferably, in the vehicle upper structure of the present invention, the fastening member 33, 31 includes a plurality of bolts 33 for fastening the gusset 30 to the roof reinforcement 15, and wherein the plurality of bolts 33 are fastened at respective positions arranged in the vehicle front-rear direction, and a line L3 connecting respective fastening centers of the plurality of bolts inclines with respect to the line L1 oriented in the vehicle front-rear direction, in top plan view.

According to this feature, the bolts are arranged such that the line connecting respective fastening centers of the bolts inclines. Thus, although a stress is imposed on each bolt fastened point between the gusset and the roof reinforce during input of a side impact load, a section modulus (resistive force) of the gusset can be increased in a simple manner to improve proof strength against the stress.

Specifically, when a side impact load is input from the center pillar, a load is applied to the end of the gusset and between the bolt fastened points, and a stress is concentrated on the inclined line connecting the plurality of bolts. In this case, the inclination of the end leads to an increase in section modulus (resistive force), which advantageously leads to enhancement in deformation resistance.

More preferably, in the above vehicle upper structure, the inclination of the end of the gusset has the same direction as the inclination of the line connecting the fastening centers of the plurality of bolts.

According to this feature, the inclination of the end of the gusset has the same direction as the inclination of the line connecting the fastening centers of the bolts. Thus, the inclinations can be formed without using an extra material, so that it becomes possible to allow the load to be dispersed to the roof reinforcement while suppressing an increase in weight of the gusset.

In this case, the inclination of the end of the gusset, and the line connecting the fastening centers of the bolts, may have the same direction, i.e., may incline in a similar direction even though their inclination angles are not identical to each other. In other words, the term "same direction" is used as a meaning of "identical direction" or "approximately identical direction". Further, an inclination angle of the end of the gusset with respect to the vehicle front-rear direction may be set to be equal to an inclination angle of the line connecting the fastening centers of the plurality of bolts, with respect to the vehicle front-rear direction.

Preferably, in the above vehicle upper structure, an edge of the roof reinforcement in the vehicle width direction is disposed opposed to a composite flange of the roof side rail inner panel and a roof side rail outer panel of the roof side rail member, and formed with a generally V-shaped notch-like portion (generally V-shaped depression) for guidingly receiving therein the composite flange during a side impact event.

According to this feature, the notch-like portion (generally V-shaped depression) is provided at the edge of the roof reinforcement in the vehicle width direction. Thus, when the roof side rail is displaced inwardly during a side impact event, the composite flange of the roof side rail is reliably received by the notch-like portion to reliably transmit and disperse a side impact load to the roof reinforcement.

This application is based on Japanese Patent Application Serial No. 2011-039237 filed in Japan Patent Office on Feb. 25, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle upper structure comprising:
right and left roof side rail members provided above a center pillar;
a roof reinforcement extending in a vehicle width direction;
a gusset coupling one of the right and left roof side rail members and the roof reinforcement together; and
a fastening member for coupling the gusset to each of a roof side rail inner panel of the one of the right and left roof side rail members and a lower surface of the roof reinforcement, the fastening member including a plurality of bolts for fastening the gusset to the roof reinforcement, the plurality of bolts positioned in a vehicle front-rear direction, and a line connecting respective fastening centers of the plurality of bolts inclines with respect to a line extending in the vehicle front-rear direction;
wherein an end of the gusset on a side fastened to the roof reinforcement has a shape that extends a distance along a line at the end of the gusset, and the shape inclines with respect to a line oriented in a vehicle front-rear direction, in top plan view, and wherein the incline of the line connecting respective fastening centers of the plurality of bolts is in the same direction as the incline of the shape.

2. The vehicle upper structure as defined in claim 1, wherein the roof reinforcement has a plurality of concave and convex beads in vertical cross-sectional side view, each of the concave and convex beads extending in the vehicle width direction.

3. The vehicle upper structure as defined in claim 1, wherein an inclination angle of the shape with respect to the vehicle front-rear direction is equal to an inclination angle of the line connecting the fastening centers of the plurality of bolts, with respect to the vehicle front-rear direction.

4. The vehicle upper structure as defined in claim 2, wherein an edge of the roof reinforcement in the vehicle width direction is disposed opposed to a composite flange of the roof side rail inner panel and a roof side rail outer panel of the one of the right and left roof side rail members, and formed with a generally V-shaped depression for guidingly receiving therein the composite flange during a side impact event.

5. The vehicle upper structure as defined in claim 1, wherein an edge of the roof reinforcement in the vehicle width direction is disposed opposed to a composite flange of the roof side rail inner panel and a roof side rail outer panel of the one of the right and left roof side rail members, and formed with a generally V-shaped depression for guidingly receiving therein the composite flange during a side impact event.

6. The vehicle upper structure as defined in claim 3, wherein an edge of the roof reinforcement in the vehicle width direction is disposed opposed to a composite flange of the roof side rail inner panel and a roof side rail outer panel of the one of the right and left roof side rail members, and formed with a generally V-shaped depression for guidingly receiving therein the composite flange during a side impact event.

7. The vehicle upper structure as defined in claim 4, wherein the edge of the roof reinforcement includes a plurality of generally v-shaped depressions.

8. The vehicle upper structure as defined in claim 7, wherein each one of the plurality of generally v-shaped depressions is similarly oriented.

\* \* \* \* \*